(12) United States Patent
Gordon

(10) Patent No.: US 8,327,644 B2
(45) Date of Patent: Dec. 11, 2012

(54) MICRO-TURBINE COMBUSTOR

(75) Inventor: Richard W. Gordon, Ray, MI (US); Nancy Ann Gordon, legal representative, Ray, MI (US)

(73) Assignee: JHRG Inc., Fraser, MI (US)

( * ) Notice: Subject to any disclaimer, the term of this patent is extended or adjusted under 35 U.S.C. 154(b) by 579 days.

(21) Appl. No.: 12/614,035

(22) Filed: Nov. 6, 2009

(65) Prior Publication Data
US 2011/0107763 A1 May 12, 2011

(51) Int. Cl.
F02C 1/00 (2006.01)
(52) U.S. Cl. ........................................ 60/745
(58) Field of Classification Search ............... 60/734, 60/737, 740, 745
See application file for complete search history.

(56) References Cited

U.S. PATENT DOCUMENTS

| | | |
|---|---|---|
| 4,000,608 A | 1/1977 | Chute |
| 4,000,609 A | 1/1977 | Chute |
| 4,034,560 A | 7/1977 | Chute |
| 4,086,760 A | 5/1978 | Chute |
| 4,359,871 A | 11/1982 | Strass |
| 4,754,607 A | 7/1988 | Mackay |
| 5,526,640 A | 6/1996 | Brooks et al. |
| 5,819,843 A | 10/1998 | Inoue et al. |
| 6,073,857 A | 6/2000 | Gordon et al. |
| 6,161,768 A | 12/2000 | Gordon et al. |
| 6,234,400 B1 | 5/2001 | Guyer |
| 6,240,718 B1 | 6/2001 | Fetescu |
| 6,679,433 B2 | 1/2004 | Gordon et al. |

FOREIGN PATENT DOCUMENTS

| | | |
|---|---|---|
| JP | 2003-013746 | 1/2003 |
| KR | 102003-009410 | 12/2003 |
| KR | 102006-013229 | 12/2006 |

OTHER PUBLICATIONS

K.W. Van Treuren, D.N. Barlow, W.H. Heiser, M.J. Wagner, N.H. Forster, "Investigation of Vapor-Phase Lubrication in a Gas Turbine Engine," Apr. 1998, Journal of Engineering for Gas Turbines and Power, vol. 120, pp. 257-262.

*Primary Examiner* — Ehud Gartenberg
*Assistant Examiner* — Arun Goyal
(74) *Attorney, Agent, or Firm* — Harness, Dickey & Pierce, P.L.C.

(57) ABSTRACT

A micro gas turbine engine for use in a turbo heater or co-generation application is described. The micro gas turbine engine includes a fuel delivery system which minimizes the development of deposits in the air-fuel passageway. To this end, a fuel delivery channel formed between a fuel deflector and a slinger body is formed with a contoured or undulating surface. A fuel deflector ring is interposed between the fuel delivery channel and the slinger impeller to facilitate the flow of the air-fuel mixture into the combustion chamber.

22 Claims, 5 Drawing Sheets

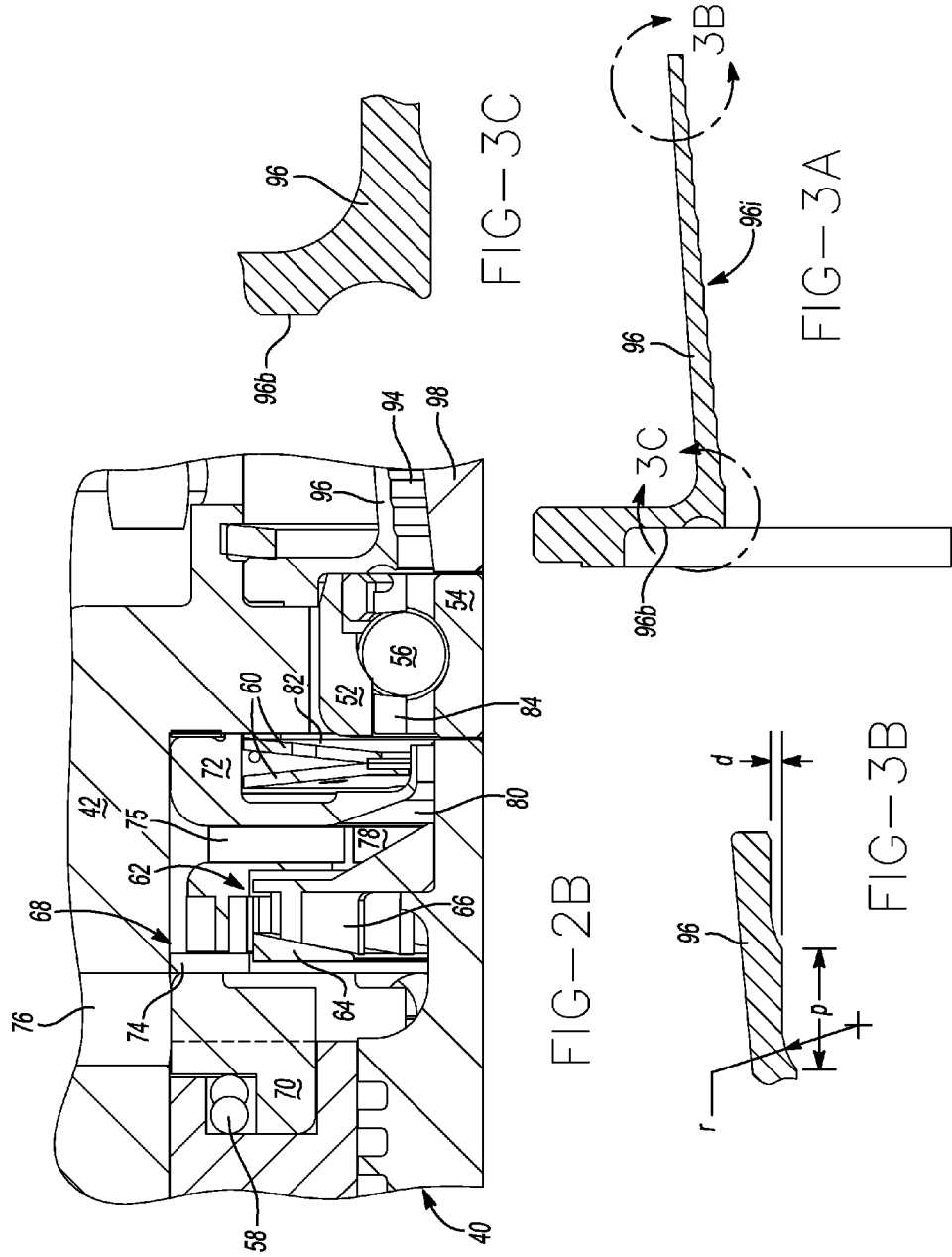

MICRO-TURBINE COMBUSTOR

FIELD

The present disclosure relates to a self-sustaining co-generator which utilizes a micro gas turbine engine to provide heated air through a heat exchanger, catalyst or direct fire and for generating rotary drive which can power an auxiliary generator, and more particularly to an improved fuel deflector/slinger assembly for the micro gas turbine engine which minimizes particle build-up in the fuel delivery system.

BACKGROUND

This section provides background information related to the present disclosure which is not necessarily prior art.

Recent efforts have shown that micro gas turbine engines can be useful in co-generation applications to provide heat and auxiliary electrical power. In particular, the small gas turbine has proven to be light, relatively trouble free and extremely efficient such that it makes an excellent heater. Exemplary embodiments of a co-generator utilizing a micro gas turbine engine are the subject of U.S. Pat. Nos. 6,073,857, 6,161,768 and 6,679,433 by Gordon et al.

These embodiments disclosed by Gordon et al. featured fuel entering the rear housing via a fuel delivery tube; where a minor amount of heat is added. The fuel delivered in the rear housing through drilled holes enters a delivery space between two Belleville springs. Hot air is also introduced at this site, and the fuel-air mixture is fed into the bearing, cooling and lubricating the bearing. Some fuel flows around the bearing flooding the spring suspension system, all the while picking up heat. The mixture then enters a slinger plenum chamber defined by a rotating slinger body and a stationary fuel deflector tube. Additional hot air from the combustion chamber is added before the fuel-air mixture enters the slinger impeller which adds more heat and injects it into the combustion chamber.

With this configuration, fuel delivery is adequate and a blue flame or non-visible flame is produced in the combustion chamber with moderately cold ambient temperatures such as those experienced in the northern states of the continental United States. However, extremely cold ambient temperatures such as those experienced in Canada and Alaska changes the stoichiometry of combustion which presents complication factors. It was known that a fuel heater may be employed to thermally condition the fuel and it was known to insulate the annulus between the combustor and the engine housing to maintain a more consistent operating temperature in the combustion chamber.

During prolonged operation in extreme conditions, it has been observed that carbon deposits can form in the fuel deflector, slinger body and slinger assembly and could not be eliminated. Conventional solutions to this problem were ineffective for eliminating these deposits, eventually leading to blockages in the fuel delivery system. Accordingly, there is a need in the art to provide a fuel delivery system in a mirco gas turbine engine that provides adequate fuel flow and thermal condition without developing excessive carbon deposits resulting in fuel blockage build-up.

SUMMARY

This section provides a general summary of the disclosure, but is not a comprehensive disclosure of its full scope or all of its features.

An improved micro gas turbine engine, and in particular an improved fuel deflector/slinger assembly are the subject of this patent disclosure. As described above, the mixture entering the fuel deflector, includes air, liquid fuel, and vaporized fuel extending into possibly a fuel plasma which essentially constitutes a complete range of heated partially combusted fuel. In order to minimize particle buildup within the fuel delivery system, the inner surface of the fuel deflector is contoured with an undulation that reduces deposits to near zero. The specific dimensions of the surface contouring is a function of the fuel preparation for which the fuel temperature, velocity and the amount of mechanical mixing which would be similar regardless of the heaters size, and thus is readily scalable to a gas turbine engines having a range of displacement.

An improved slinger impeller is also the subject of this patent disclosure. In particular, the improved slinger impeller features completely round channels eliminating corners and pockets where deposits can readily form. The channels are formed by drilling tapered holes around the impeller diameter. The improved impeller also features less back sweep than previous impellers.

In addition, a radial deflector ring having multiple short triangular blades is positioned upstream of the impeller. The deflector ring facilitates flow from the channel bounded by the fuel deflector tube into the inducer and then into the impeller. The deflector ring also mixes and impacts the fuel, air, and combustion products mixture to a final near uniform product, further reducing the tendency for deposits formation.

Further scope of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2B is an enlarged view of the fuel delivery system and the rear bearing assembly indicated at B-B in FIG. 2A;

FIG. 3A is a detailed illustration of the fuel deflector shown in FIG. 2;

FIG. 3B is an enlarged view of the undulating surface formed on the inner surface of the fuel deflector indicated at B-B in FIG. 3A;

FIG. 3C is an enlarged view of the flange on the fuel deflector that interfaces with the rear bearing race indicated at C-C in FIG. 3A;

Corresponding reference numerals indicate corresponding parts throughout the several views of the drawings.

DETAILED DESCRIPTION

Example embodiments will now be described more fully with reference to the accompanying drawings. These example embodiments are provided so that this disclosure will be thorough, and will fully convey the scope to those who are skilled in the art. Various specific details are set forth such as examples of components, devices, and methods, to provide a thorough understanding of embodiments of the present disclosure. It will be apparent to those skilled in the art that specific details need not be employed, that example embodiments may be embodied in different forms and that neither should be construed to limit the scope of the disclosure. In some example embodiments, well-known processes, well-known device structures, and well-known technologies are not described in detail.

Figure 1:
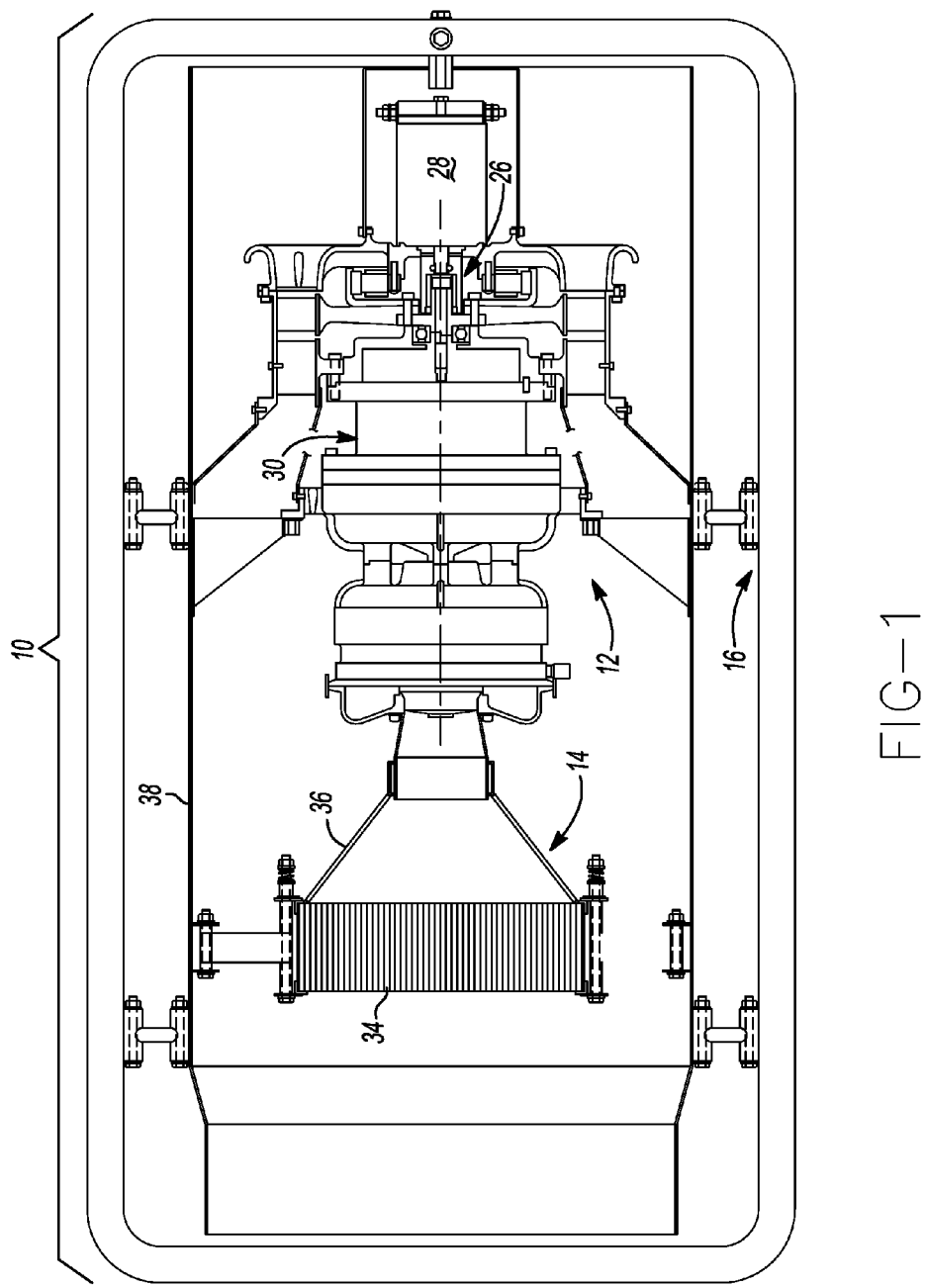
FIG. 1 is a partial cross-sectional view of a turbo heater having a micro gas turbine engine and a catalytic heat exchange element.
Figure 2A:
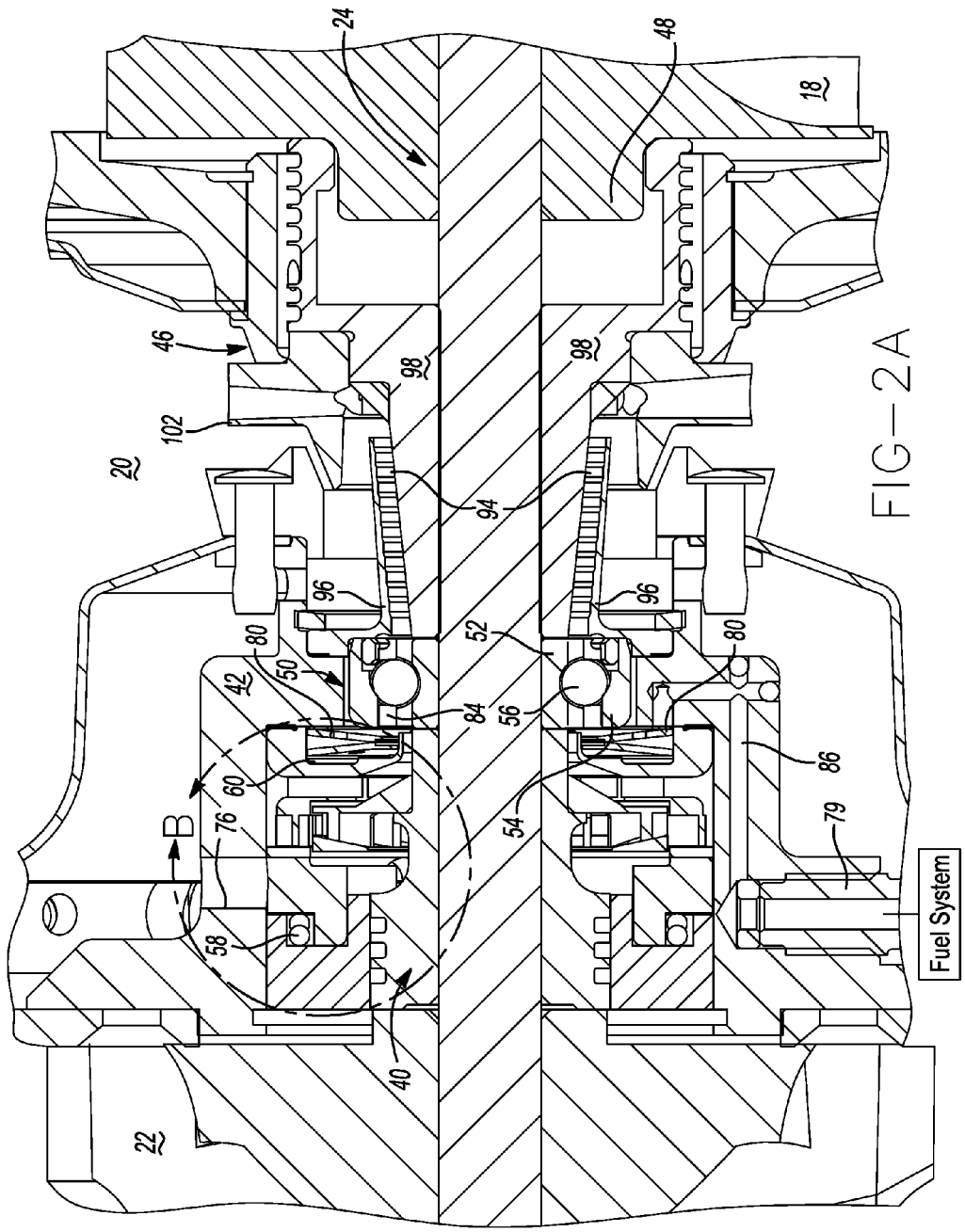
FIG. 2A is a detailed view illustrating the nozzle hub, rear bearing assembly and fuel slinger of the gas turbine engine illustrated in FIG. 1.

With reference now to FIGS. 1 and 2A, a co-generator or turbo heater 10 includes a gas turbine engine 12 and a catalytic heat exchange element 14 which are supported within a frame assembly 16. Gas turbine engine 12 draws ambient air through a compressor 18, receives fuel from a fuel system to form an air-fuel mixture, combusts the air-fuel mixture in a combustor 20 and discharges and expands the exhaust gases through a turbine 22. As such, gas turbine engine 12 provides a source of heat, as well as a source of rotary power. The rotating components of gas turbine engine 12, namely compressor 18 and turbine 22, are mounted on a common high-speed shaft assembly 24. The shaft assembly 24 is coupled through a reduction gear assembly or gear box to an axial fan 26 and a starter motor 28. The gear box may also be coupled to a generator set 30 (not shown) for providing electrical power. The starter motor 28 is coupled to the axial fan 26 through a one-way over-running clutch assembly which permits power transmission in a first rotational direction and free wheeling in a second rotational direction.

Turbo heater 10 is a diesel fueled self-contained and self-sustaining heating system for supplying heated air and electrical power in remote locations. Gas turbine engine 12 is designed to supply the majority of its energy as heat in the form of exhaust gases, and a minor amount as shaft power used to drive the axial fan 26 and other auxiliary power generation mechanisms.

Turbo heater 10 is designed to feature economical construction and is especially designed for reduced manufacturing cost. The internal aerodynamics, such as the turbine and compressor wheels, use well-developed turbocharger technology. For example, the preferred flow and pressure ratios are nearly optimum for automotive turbocharger components, and are thus near-optimum for use in the turbo heater 10. A peak cycle temperature of 1500° Fahrenheit (° F.) is preferred to allow the use of economical materials for the high temperature components.

With continued reference to FIG. 1, a heat exchange element 14 is used to recover the resulting heat in the exhaust gases. In this regard, turbo heater 10 is equipped with a suitable catalytic converter 34 which reduces the carbon monoxide and other toxic emissions in the exhaust gases to supply essentially breathable heated air as illustrated in FIG. 1. This exemplary embodiment is especially suitable for outdoor construction applications, wherein heated air is produced using a catalytic element 34 located within the heat exchanger assembly 14. Since the combustor 20 in the gas turbine engine 12 produces significantly less carbon monoxide (CO) as compared to a gasoline spark ignition engine, a properly fitted catalytic element 34 on the gas turbine engine 12 can reduce the emissions to acceptable levels. The catalytic element 34 is fitted directly to the exhaust of gas turbine engine 12 by means of a diffuser duct 36. The exhaust from the catalytic element 34 will be in the range of 1250° F. to 1300° F. maximum and the additional air flow from the axial fan 26 will pass around the catalytic element 34 and within the volume defined by housing 38 for mixing and blending with fresh air to produce a relatively even discharge temperature of approximately 250° F. In this manner, the efficiency of the turbo heater 10 can approach 97%, depending upon the amount of electrical power being concurrently generated.

Alternately, an air-to-air heat exchangers, an air-to-liquid heat exchanger, a liquid coil or a combination thereof may be used to generate heated air, heated liquid or both. Similarly, in some applications where human consumption of the heated air is not a requirement, a heat exchanger or catalytic converter may not be required such that the exhaust gas directly from the gas turbine engine 12 is mixed with fresh air from the axial fan 26 to produce a heated mixture of exhaust gases and air.

The turbo heater 10 is self-contained and nearly instantaneously starting, and will operate at a minimum heat output on a reasonable on-off cycle for lower heat requirements. Operation of the turbo heater 10 in this manner can provide an environment of uniform heat, using the minimum fuel necessary. As such, the turbo heater 10 is an ideal source of heated air as it can supply a large quantity of heat at relatively low ambient temperatures. For example, while nominally rated at 500,000 Btu/hr, the turbo heater 10 can be modulated from less than 250,000 Btu/hr to greater than 750,000 Btu/hr at an ambient temperature of minus 50° F.

Further details concerning the components and operation of the turbo heater 10 and the gas turbine engine 12 are set forth in U.S. Pat. Nos. 6,073,857, 6,161,768 and 6,679,433 to Gordon et al. The entire disclosure of each of the above patents is incorporated herein by reference.

Referring now to FIGS. 2A and 2B, the high speed shaft assembly 24 includes a center shaft assembly 40 located forward of the turbine 22 and extending through turbine nozzle assembly 42. The center shaft assembly 40 includes fuel slinger assembly 46 which is press fit onto a pilot spigot 48 formed as a part of the compressor 18. High speed shaft assembly 24 is rotatably supported by rear bearing assembly 50 having inner bearing race 52, outer bearing race 54, and ball bearing 56. Compression springs 58 in combination with Belleville springs 60 biases the shaft assembly 24 towards the compressor side of the gas turbine engine 12 to properly locate the shaft assembly.

With reference to FIG. 2B, the center shaft assembly 40 also includes scavenger blower 62 with impeller blades 64 extending from scavenger vane 66. A fixed diffuser assembly 68 is positioned between the spring seat 70 and cover plate 72. The fixed diffuser assembly 68 includes rear diffuser blades 74 adjacent to scavenger blower 62 and front diffuser blades 75 which abuts cover plate 72. Air is introduced from the compressor 22 through passageway 76 to the region between the center shaft assembly 40 and the nozzle assembly 42. The pressurized air flows through the rear diffuser assembly 68, over and down through annulus 78 and to annulus 80 between cover plate 72 and rear bearing assembly 50. Fuel is communicated from the fuel feed tube 79 through a fuel passageway 86 and into annulus 82. Fuel flows between Belleville springs 60 and cover plate 72 into open annulus 84 in the bearing assembly 50 where the fuel is conditioned and mixed with pressurized air from the compressor 18 such that it is atomized.

The fuel-air mixtures passes through the rear bearing assembly 50 and passes into fuel delivery channel 94. The fuel delivery channel 94 is diverging with respect to the longitudinal axis of the center shaft assembly 40 and is defined between fuel slinger assembly 46 and fuel deflector 96. As can be seen in FIGS. 3A and 3C, the rear surface 96b has a recessed formed therein adjacent to rear bearing assembly 50 to facilitate fuel delivery into the channel 94. With reference to FIGS. 2A and 4A-4D, the slinger assembly 46 is a part of the center shaft assembly 40 and includes slinger body 98, radial deflector ring 100 and slinger impeller 102. Fuel is centrifugally driven forwardly onto the radial deflector ring 100 and outwardly through the ports 104 formed in the slinger impeller 102. Specifically, an outer surface of the slinger body 98 and the inner surface of the fuel deflector 96 define a radially diverging fuel delivery channel 94. The radial deflector ring 100 is located at the end of the fuel delivery channel 94 and has an angled face 106 directed toward the inlet ports 104. A series of triangular blades 108 extend from angled face 106. As presently preferred, sixteen blades 108 are equidistantly spread about the deflector ring 100. The angled face 106 and triangular blades 108 efficiently direct the air-fuel mixture from the fuel delivery channel 94 to the inlet ports 104 formed in the slinger impeller, while further minimizing an accumulation of deposits in the fuel delivery path.

Figure 4A:
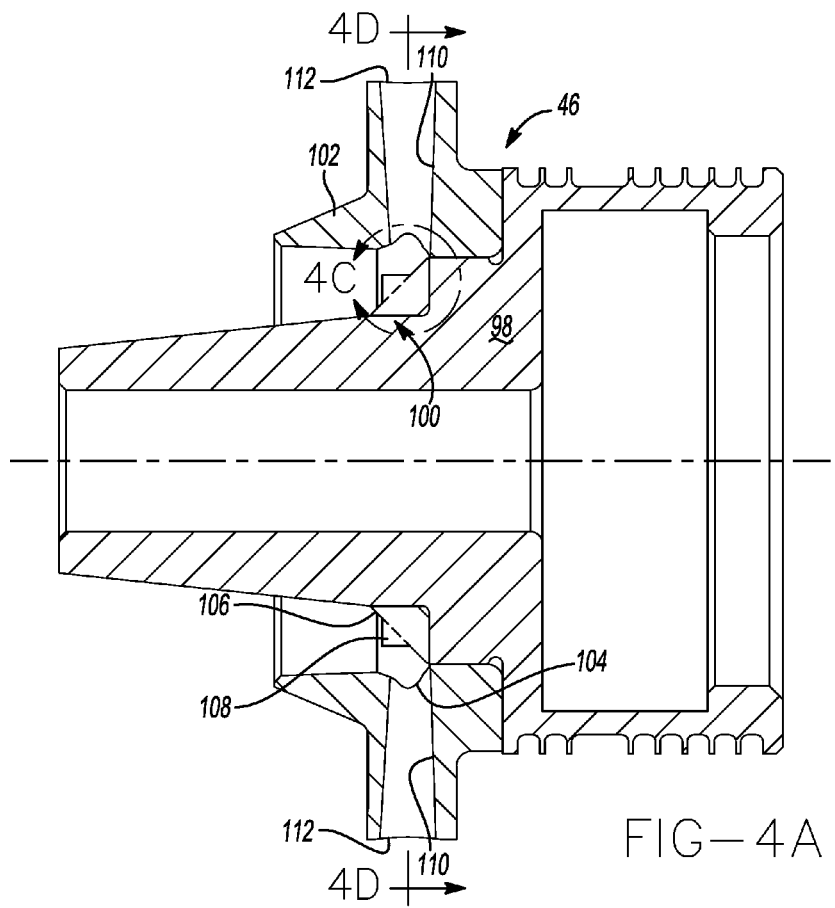
FIG. 4A is a detailed illustration of the slinger assembly shown in FIG. 2.
Figure 4B:
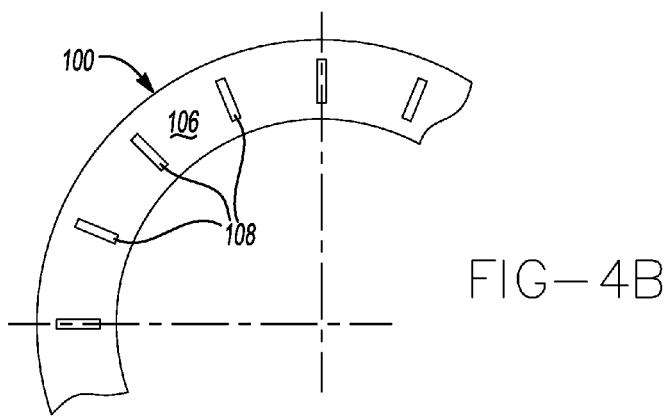
FIG. 4B is an enlarged view of the deflector ring.
Figure 4C:
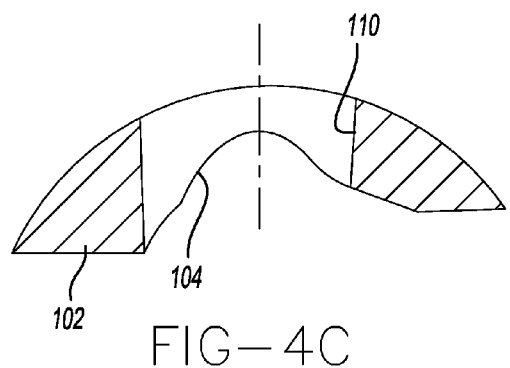
FIG. 4C is a detailed illustration of the slinger inlet port taken at line C-C shown in FIG. 4A.
Figure 4D:
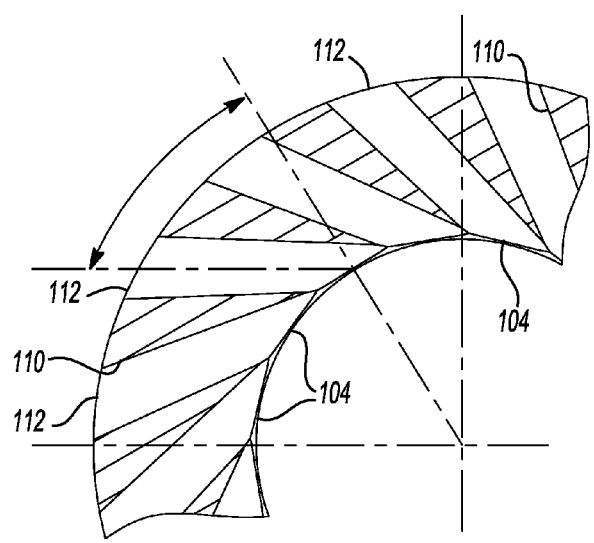
FIG. 4D is a cross-sectional view taken at line D-D.

As best shown in FIG. 4C, inlet port 104 is radiused to eliminate any surface normal to the flow of the air-fuel mixture. The slinger impeller 102 also has smoothly shaped discharge passages 110 eliminating corner regions where deposits can readily form which terminate at outlet ports 112. The discharge passages 110 are formed by drilling tapered holes around the circumference of the slinger impeller 102 eliminating corners in the fuel delivery path. The slinger impeller 102 is also provided with a small back sweep to define a back-swept passage as best seen in FIG. 4D. In particular, the outlet port 112 is circumferentially offset from a radial line extending through the inlet port as shown in FIG. 4D.

As previously mentioned, the mixture entering the fuel deflector 96, is air, liquid fuel, vaporized fuel extending into possibly a plasma, essentially a complete range of heated partially combusted fuel which can result in a slow particle build-up over time to the point of creating a blockage in the fuel delivery path. As best shown in FIGS. 3A and 3B, the inner surface 96i of fuel deflector is provided with an undulating contour to alleviate this problem. As presently preferred, a series of concentric undulations are formed in the inner surface 96i of the fuel deflector 96 along the longitudinal axis. These concentric undulations extend from the inlet to the outlet of fuel delivery channel 94. In particular, experiments conducted on a micro gas turbine engine with a fuel deflector having a twelve-part undulation, each with a pitch (p) of approximately 1.5 mm, a depth (d) of about 0.1 mm and a leading edge radius (r) of about 0.8 mm, produced a significant reduction in deposits approaching zero measurable deposits. The scaling (i.e., relative size) of the undulating contour for different displacement engines is only limited to surface dimensions close to those stated above as the condition of the fuel is a function of the fuel preparation for which the fuel temperature, velocity and the amount of mechanical mixing which would be similar regardless of the heaters size.

The fuel-air mixture being discharged from the fuel delivery channel 94 enters the slinger assembly 46, along with additional air entrained from the combustor 20. The air-fuel mixture is combusted and exhaust through turbine 22 which in turn drives compressor 18 via shaft assembly 24.

One skilled in the art will recognized that the turbo heater 10 may be provided with an engine controller and various sensors to monitor and control engine operating parameters, an ignition system for initiating combustion, an electric fuel pump that pumps fuel to fuel passageway 79, 86 formed in gas turbine engine 12, and a starting system with a starter motor which is adequately sized to insure adequate power to start the gas turbine engine 12 during very cold weather. The details of these components, as well as operation of the turbo heater 10 are set forth in the patents to Gordon et al. previously incorporated by reference herein.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A gas turbine engine comprising:
  an engine housing rotatably supporting a shaft assembly on a bearing assembly;
  a combustion chamber encased with said engine housing;
  a compressor coupled to said shaft assembly for rotation about a longitudinal axis, said compressor in fluid communication with said combustion chamber;
  a turbine coupled to said shaft assembly for rotation about said longitudinal axis, said turbine in fluid communication with said combustion chamber; and
  a fuel delivery system for delivering an air-fuel mixture to said combustion chamber, said fuel delivery system including:
  a fuel slinger assembly rotatably supported on said shaft assembly including a slinger body and a slinger impeller, said slinger impeller having a discharge passage in fluid communication with said combustion chamber; and
  a fuel deflector fixedly supported within said engine housing, said fuel deflector having a inner surface spaced apart from and facing an outer surface of said slinger body to form a fuel delivery channel, said fuel delivery channel beginning at an inlet in fluid communication with a fuel feed tube, diverging along said longitudinal axis and terminating at an outlet adjacent said discharge passage of said slinger impeller, and wherein at least one of said inner and outer surfaces having a contoured surface formed therein.

2. The gas turbine engine of claim 1 wherein said contoured surface comprises a plurality of concentric undulations formed in said inner surface along said longitudinal axis from said inlet and said outlet.

3. The gas turbine engine of claim 2 wherein said contoured surface further comprises a radiused transition between each of said plurality of concentric undulations.

4. The gas turbine engine of claim 1 wherein said slinger impeller is secured to said slinger body for co-rotation therewith.

5. The gas turbine engine of claim 1 further comprising a plurality of holes extending generally radially through said slinger impeller to form said discharge passage.

6. The gas turbine engine of claim 5 wherein each of said plurality of holes diverges from an inlet port adjacent said fuel delivery channel to an outlet port adjacent said combustion chamber to define a tapered discharge passage.

7. The gas turbine engine of claim 5 wherein each of said plurality of holes has an inlet port adjacent said fuel delivery channel and an outlet port adjacent said combustion chamber, said outlet port being circumferentially offset from a radial line extending through the inlet port to define a back-swept passage.

8. The gas turbine engine of claim 5 wherein each of said plurality of holes has an contoured inlet port adjacent said fuel delivery channel and an outlet port adjacent said combustion chamber.

9. The gas turbine engine of claim 1 further comprising a fuel deflector ring having an angled face interposed between said outlet of said fuel delivery channel and said discharge passage.

10. The gas turbine engine of claim 9 wherein said fuel deflector ring is secured to said slinger body for co-rotation therewith.

11. The gas turbine engine of claim 9 wherein said fuel deflector ring further comprises a plurality of blades extending from said angled face and equidistantly spaced around said deflector ring.

12. The gas turbine engine of claim 1 in combination with a heat exchange element in fluid communication with said turbine such that exhaust gases discharged from the gas turbine engine pass through said heat exchange element.

13. The gas turbine engine of claim 1 in combination with a catalytic converter element in fluid communication with said turbine such that exhaust gases discharged from the gas turbine engine pass through said catalytic converter element.

14. A gas turbine engine comprising:
a turbine nozzle assembly disposed within an engine housing and supporting a nozzle hub;
a shaft assembly disposed within said nozzle hub and defining an annulus therebetween;
a bearing assembly disposed within said annulus and supporting said shaft assembly in said nozzle hub for rotation about a longitudinal axis;
a fuel deflector supported on said nozzle hub and extending from said annulus, said fuel deflector having a contoured inner surface;
a turbine operably disposed on a first end of said shaft assembly;
a compressor operably disposed on a second end of said shaft assembly;
a combustion chamber concentrically disposed about the shaft assembly between the compressor and the turbine;
a fuel feed tube for delivering fuel to said annulus;
a fuel slinger assembly coupled to said shaft assembly for rotation therewith, said fuel slinger assembly including a slinger body with an outer surface spaced apart from and facing said inner surface of said fuel deflector to form a fuel delivery channel, said fuel delivery channel beginning at an inlet in fluid communication with said annulus, diverging along said longitudinal axis and terminating at an outlet, and a slinger impeller having a discharge passageway formed therein adjacent said outlet to provide fluid communication from said fuel delivery channel to said combustion chamber.

15. The gas turbine engine of claim 14 wherein said contoured surface comprises a plurality of concentric undulations formed in said inner surface along said longitudinal axis from said inlet and said outlet.

16. The gas turbine engine of claim 15 wherein said contoured surface further comprises a radiused transition between each of said plurality of concentric undulations.

17. The gas turbine engine of claim 14 further a plurality of holes extending through said slinger impeller to form said discharge passage, each of said plurality of holes diverges from an inlet port adjacent said fuel delivery channel to an outlet port adjacent said combustion chamber to define a tapered discharge passage.

18. The gas turbine engine of claim 17 wherein said outlet port is circumferentially offset from a radial line extending through said inlet port to define a back-swept passage.

19. The gas turbine engine of claim 14 further comprising a fuel deflector ring secured to said slinger body for co-rotation therewith, said deflector ring having an angled face interposed between said outlet of said fuel delivery channel and said discharge passage.

20. The gas turbine engine of claim 19 wherein said fuel deflector ring further comprises a plurality of blades extending from said angled face and equidistantly spaced around said deflector ring.

21. The gas turbine engine of claim 14 in combination with a heat exchange element in fluid communication with said turbine such that exhaust gases discharged from the gas turbine engine pass through said heat exchange element.

22. The gas turbine engine of claim 14 in combination with a catalytic converter element in fluid communication with said turbine such that exhaust gases discharged from the gas turbine engine pass through said catalytic converter element.

* * * * *

UNITED STATES PATENT AND TRADEMARK OFFICE
CERTIFICATE OF CORRECTION

| | | |
|---|---|---|
| PATENT NO. | : 8,327,644 B2 | Page 1 of 1 |
| APPLICATION NO. | : 12/614035 | |
| DATED | : December 11, 2012 | |
| INVENTOR(S) | : Richard W. Gordon et al. | |

It is certified that error appears in the above-identified patent and that said Letters Patent is hereby corrected as shown below:

On the Title Page, Item (56), References Cited, Foreign Patents

Line 2, "KR 102003-009410" should be --KR 102003-0094108--

Line 3, "KR 102006-013229" should be --KR 102006-0132297--.

In the Claims

Column 6

Line 49 Claim 1, after "having a" insert --contoured--.

Lines 55-56 Claim 1, after "and wherein" delete "at least one of".

Line 56 Claim 1, after "said" insert --contoured--.

Line 56 Claim 1, after "inner" delete "and outer surfaces having a contoured".

Line 57 Claim 1, after "surface" insert --has a plurality of undulations--.

Column 7

Line 15 Claim 8, "an contoured" should be --a contoured--.

Line 48 Claim 14, after "inner surface" insert --having a plurality of undulations formed therein--.

Column 8

Line 17 Claim 15, after "contoured" insert --inner--.

Line 23 Claim 17, After "further" insert --comprising--.

Signed and Sealed this
Twentieth Day of August, 2013

Teresa Stanek Rea
*Acting Director of the United States Patent and Trademark Office*